United States Patent [19]

Birsching

[11] Patent Number: 5,749,432

[45] Date of Patent: May 12, 1998

[54] POWER STEERING GEAR FOR MOTOR VEHICLE

[75] Inventor: Joel Edward Birsching, Unionville, Mich.

[73] Assignee: General Motors Corporation, Detroit, Mich.

[21] Appl. No.: 673,468

[22] Filed: Jul. 1, 1996

[51] Int. Cl.$^6$ .............................. B62D 5/04; B62D 5/083
[52] U.S. Cl. ..................... 180/443; 310/115; 310/116; 192/84.31
[58] Field of Search ........................... 180/421, 441, 180/443, 446, 400, 422, 423; 91/375 A; 310/115, 116; 192/84.1, 84.3, 84.31

[56] References Cited

U.S. PATENT DOCUMENTS

| | | | |
|---|---|---|---|
| 4,871,040 | 10/1989 | Zuraski et al. | 180/142 |
| 4,886,137 | 12/1989 | Pawlak et al. | 180/142 |
| 4,886,138 | 12/1989 | Graber et al. | 180/422 |
| 5,038,063 | 8/1991 | Graber et al. | 310/115 |
| 5,070,956 | 12/1991 | Pawlak et al. | 180/132 |
| 5,119,898 | 6/1992 | Eckhardt et al. | 180/142 |
| 5,412,530 | 5/1995 | Shimizu | 361/185 |
| 5,454,439 | 10/1995 | Birsching | 180/79.1 |
| 5,492,191 | 2/1996 | Birsching | 180/79.1 |
| 5,677,581 | 10/1997 | Yoshida et al. | 310/156 |

*Primary Examiner*—Brian L. Johnson
*Assistant Examiner*—Gary Savitt
*Attorney, Agent, or Firm*—Robert M. Sigler

[57] ABSTRACT

A motor vehicle power steering gear has a proportional control valve with first and second valve members connected by a torsion spring and defining a center position with zero torque in the torsion spring. Electromagnetic apparatus for varying the magnitude of the effective restoring torque of the torsion spring comprises a stationary exciting coil, a circular permanent magnet member connected to one of the first and second valve members for rotation therewith and comprising a plurality (n) of permanent magnets of alternating radial polarity, and a pole piece connected to the other of the first and second valve members for rotation therewith, magnetically coupled to the exciting coil, and having a pair of magnetic flux conducting rings each defining a plurality (n/2) of pole teeth facing the permanent magnet member and opposing the pole teeth of the other to define pole tooth pairs each having a region of circumferential overlap. The permanent magnet member is rotationally oriented, with the first and second valve members in the center position, in a position of zero electromagnetic torque with no current in the exciting coil and with alternate ones of the boundaries separating the permanent magnets aligned substantially at the centers of the regions of circumferential overlap of successive pole tooth pairs, whereby electric current through the exciting coil provides substantial torque between the first and second valve members at and around the center position. Valve angle sensing apparatus provides a signal for controlling current through the exciting coil to provide a steering preload.

3 Claims, 6 Drawing Sheets

POWER STEERING GEAR FOR MOTOR VEHICLE

BACKGROUND OF THE INVENTION

U.S. Pat. Nos. 4,454,801, issued 19 Jun. 1984, and 3,022,772, issued 27 Feb. 1962, both assigned to the assignee of this invention, describe a proportional control valve in motor vehicle power steering gear including a valve spool connected to a manual steering wheel, a valve body connected to steered wheels of the vehicle, and a torsion bar between the valve spool and valve body defining a center position of the former relative to the latter. A plurality of throttling orifices of the control valve defined between the valve body and the valve spool regulate a steering assist boost pressure when the valve spool is rotated relative to the valve body from the center position by manual effort at the steering wheel. Rotation of the valve spool relative to the valve body induces a restoring or centering torque in the torsion bar which is perceived by a driver as the manual effort necessary to steer the vehicle.

U.S. Pat. No. 5,119,898, issued 9 Jun. 1992 and assigned to the assignee of this invention, describes a power steering gear having a proportional control valve as described above and an electromagnetic apparatus for varying the effective centering torque of the torsion bar. The electromagnetic apparatus includes a cylindrical ring attached to the valve spool having a plurality of radial permanent magnets thereon, a pole piece attached to the valve body having a plurality of outer pole teeth outside the magnet ring and a plurality of inner pole teeth inside the magnet ring, and a stationary exciting coil magnetically coupled to the pole teeth. An electromagnetic torque is induced between the pole piece and the permanent magnet ring which either increases or decreases the effective centering torque of the torsion bar depending upon the direction of current flow in the exciting coil.

However, the above-recited power steering gears share the characteristic that no torque is available in the center position and little is available for some rotational valve angle to either side of the center position. Thus, with typical calibration, the restoring torque is low for small valve angles; and this can provide a "vague" steering "feel" to the vehicle operator in higher velocity operation, where small valve angles are typical. However, if the torque at small angles is increased by increased coil current, stronger magnets, etc. in order to provide a "crisp" steering "feel", the steering effort at greater angles, can become undesirably high. Although coil current can be programmed smaller at lower speed to reduce steering effort in parking and other low speed maneuvers, this will not take care of situations such as highway exit ramps, where it may be necessary for the vehicle operator to hold the steering wheel against a high steering load for some time. It is desirable in some vehicles to provide for power steering gears such as those described above a steering preload in which restoring torque increases substantially with valve angle for a small range of valve angles just off center to provide "crisp" steering at high velocities and at a significantly slower angular rate at greater valve angles in order to limit steering loads for ease of steering at the greater angles. Such a steering preload is normally provided by extra mechanical or hydraulic apparatus which adds cost to the system.

SUMMARY OF THE INVENTION

The invention comprises a motor vehicle power steering gear having a proportional control valve comprising a first valve member connected to a steered wheel of the vehicle, a second valve member connected to a manual steering wheel of the vehicle and rotatable with reference to the first valve member, and a torsion spring connected between the first valve member and the second valve member. The proportional valve defines a center position of the second valve member relative to the first valve member with the torsion spring resisting relative rotation of the second valve member from the center position with a restoring mechanical torque proportional to the amount of twist of the torsion spring caused by manual effort applied at the manual steering wheel of the vehicle. The invention further comprises an electromagnetic apparatus for varying the magnitude of the effective restoring torque of the torsion spring comprising a stationary exciting coil, a circular permanent magnet member connected to one of the first and second valve members for rotation therewith and comprising a plurality (n) of permanent magnets of alternating radial polarity, each permanent magnet being separated circumferentially from adjacent permanent magnets by boundaries, and a pole piece connected to the other of the first and second valve members for rotation therewith, magnetically coupled to the exciting coil, and having a pair of magnetic flux conducting rings each defining a plurality (n/2) of pole teeth opposing the pole teeth of the other to define pole tooth pairs each having a region of circumferential overlap, the magnetic flux conducting rings disposed with the circular permanent magnet member therebetween. In the apparatus of the invention, the permanent magnet member is rotationally oriented, with the second valve member in the center position, in a position of zero electromagnetic torque with no current in the exciting coil and with alternate ones of the boundaries separating the permanent magnets aligned substantially at the centers of the regions of circumferential overlap of successive pole tooth pairs.

This position of the permanent magnet ring is one quarter tooth pitch (one half magnet pitch) offset from that of the prior art and produces substantial electromagnetic torque with current in the exciting coil at all valve angles including those adjacent the center position. The addition of a current control responsive to valve angle sensing apparatus provides a programmed variation of electric current through the exciting coil as a function of valve angle to provide a steering preload or a variety of other load functions electromagnetically.

DESCRIPTION OF A PREFERRED EMBODIMENT

Figure 1:
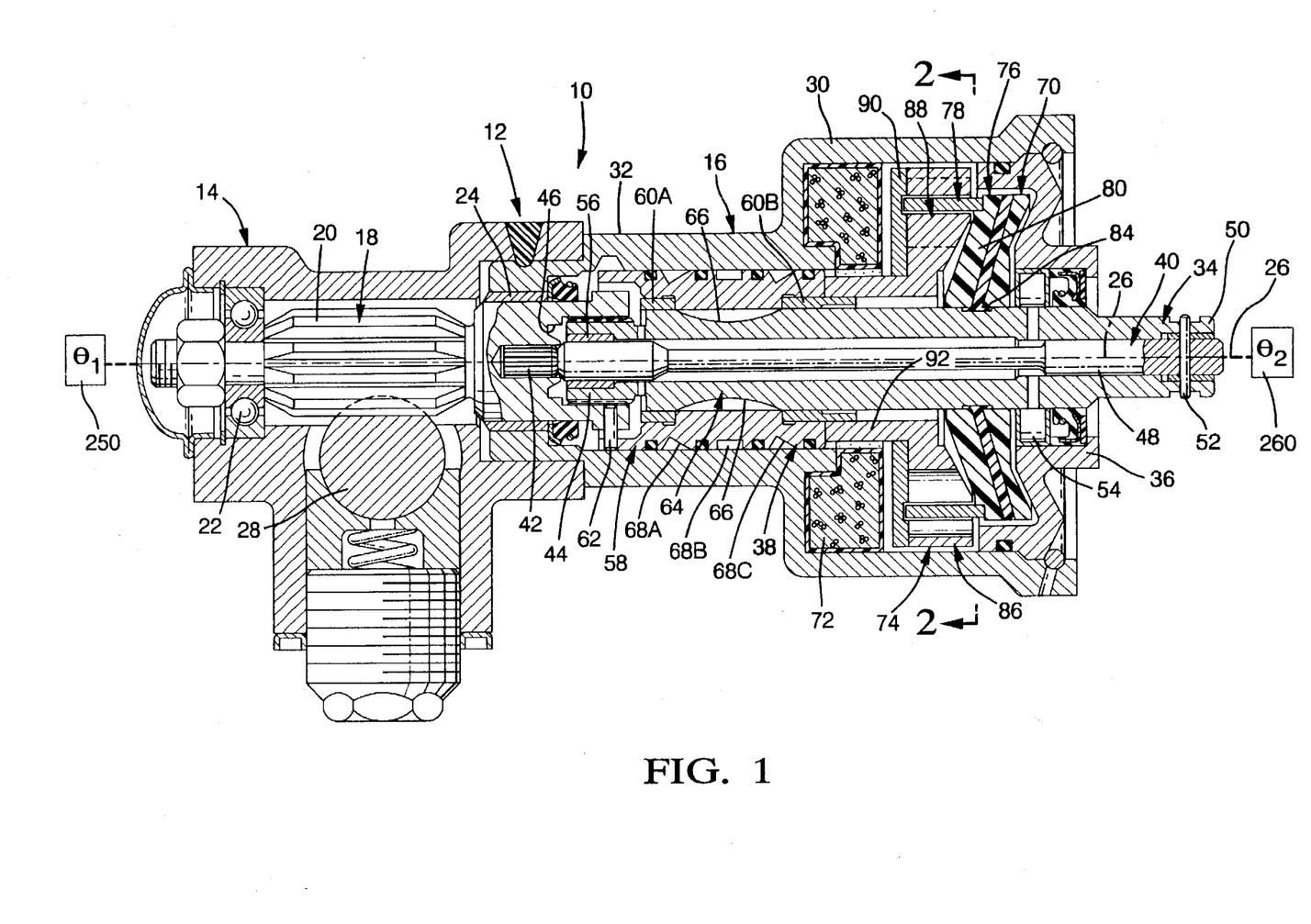
FIG. 1 is a sectional view of a motor vehicle power steering gear according to this invention taken along a longitudinal centerplane thereof.

Referring to FIG. 1, a motor vehicle power steering gear 10 according to this invention is generally as described in the aforesaid U.S. Pat. No. 5,119,898 and includes a composite housing 12 consisting of a rack housing 14 and a valve housing 16. A pinion head 18 having a plurality of gear teeth 20 thereon is supported on the rack housing 14 by a ball bearing 22 and by a sleeve bearing 24 for rotation about a centerline 26 of the composite housing 12. A rack bar 28, having a plurality of rack teeth meshing with the gear teeth 20 on the pinion head, is supported on the rack housing 14 for bodily movement perpendicular to the centerline 26 in response to rotation of the pinion head. The ends of the rack bar, not shown, are connected to steerable wheels of the motor vehicle in conventional fashion.

Valve housing 16 has a large diameter part 30 and a small diameter part 32. A tubular stub or spool shaft 34 of the steering gear protrudes into valve housing 16 through a cover 36 at an open end of large diameter part 30. A proportional control valve 38 of steering gear 10, like the proportional control valves described in the aforesaid U.S. Pat. Nos. 4,454,801 and 3,022,772, is disposed inside small diameter part 32 of the valve housing and includes a torsion bar 40 inside spool shaft 34. Torsion bar 40 has a serrated inboard end 42 protruding beyond a corresponding inboard end 44 of spool shaft 34 and force fitted in a bore inside a counterbore 46 in pinion head 18. Torsion bar 40 has an outboard end 48 rigidly connected to spool shaft 34 at an outboard end 50 of the latter by a pin 52.

The outboard end 50 of spool shaft 34 is connected to a manual steering wheel, not shown, of the motor vehicle for rotation as a unit therewith. Spool shaft 34 is supported on composite housing 12 for rotation about centerline 26 independent of pinion head 18 by a roller bearing 54 on cover 36 and by a sleeve bearing 56 between the torsion bar and the spool shaft. A lost motion connection in counterbore 46 permits about 14 degrees of relative angular movement between the pinion head and the spool shaft.

A tubular valve body 58 of proportional control valve 38 is supported on spool shaft 34 for rotation about centerline 26 independent of the spool shaft by a pair of bushing rings 60A–B press fitted in counterbores in the ends of the valve body. Valve body 58 is connected by a pin 62 to pinion head 18 for rotation as a unit therewith. A valve spool 64 of proportional control valve 38 is defined on spool shaft 34 inside valve body 58 and includes a plurality of arc-shaped slots 66 facing a plurality of internal grooves, not shown, in the valve body and cooperating therewith in defining a plurality of variable area throttling orifices. A plurality of outside annular grooves 68A–C on the valve body 58 are isolated from one another by seal rings slidably engaging the wall of the small diameter part 32 of the valve housing. Grooves 68A, 68C are connected to opposite working chambers, not shown, of a steering assist fluid motor. Groove 68B is connected to a pump, not shown. These hydraulic connections may be as shown in the aforementioned U.S. Pat. Nos. 5,119,898 and 4,454,801, the disclosures of which are incorporated herein by reference.

Torsion bar 40, when it has no twist between its outboard end 48 and inboard end 42 and thus exerts no torque therebetween, defines a center position of valve spool 64 relative to valve body 58 in which all the throttling orifices are equally open and fluid circulates freely from groove 68B to a drain, not shown, connected to a reservoir. When valve spool 64 is rotated relative to valve body 58 by manual effort applied at the steering wheel, one half of the throttling orifices become smaller and regulate a steering assist boost pressure in a corresponding one of the grooves 68A, 68C and one half of the throttling orifices become larger for unobstructed drainage of fluid from the other of the grooves 68A, 68C to the reservoir. The flow area of the smaller throttling orifices is proportional to the amount of twist between outboard end 48 of the torsion bar and inboard end 42 thereof. The centering torque of torsion bar 40 resisting such twist is the manual effort necessary to steer the vehicle perceived by the operator through the steering wheel.

An electromagnetic apparatus 70 of steering gear 10 varies the effective centering torque of the torsion bar to change the level of steering assist, i.e. steering assist boost pressure, achieved for a given manual steering input applied at the steering wheel of the motor vehicle. Electromagnetic apparatus 70 includes a stationary exciting coil 72 at the inboard end of large diameter part 30 of valve housing 16, a pole piece 74, and a permanent magnet assembly 76.

Figure 2:
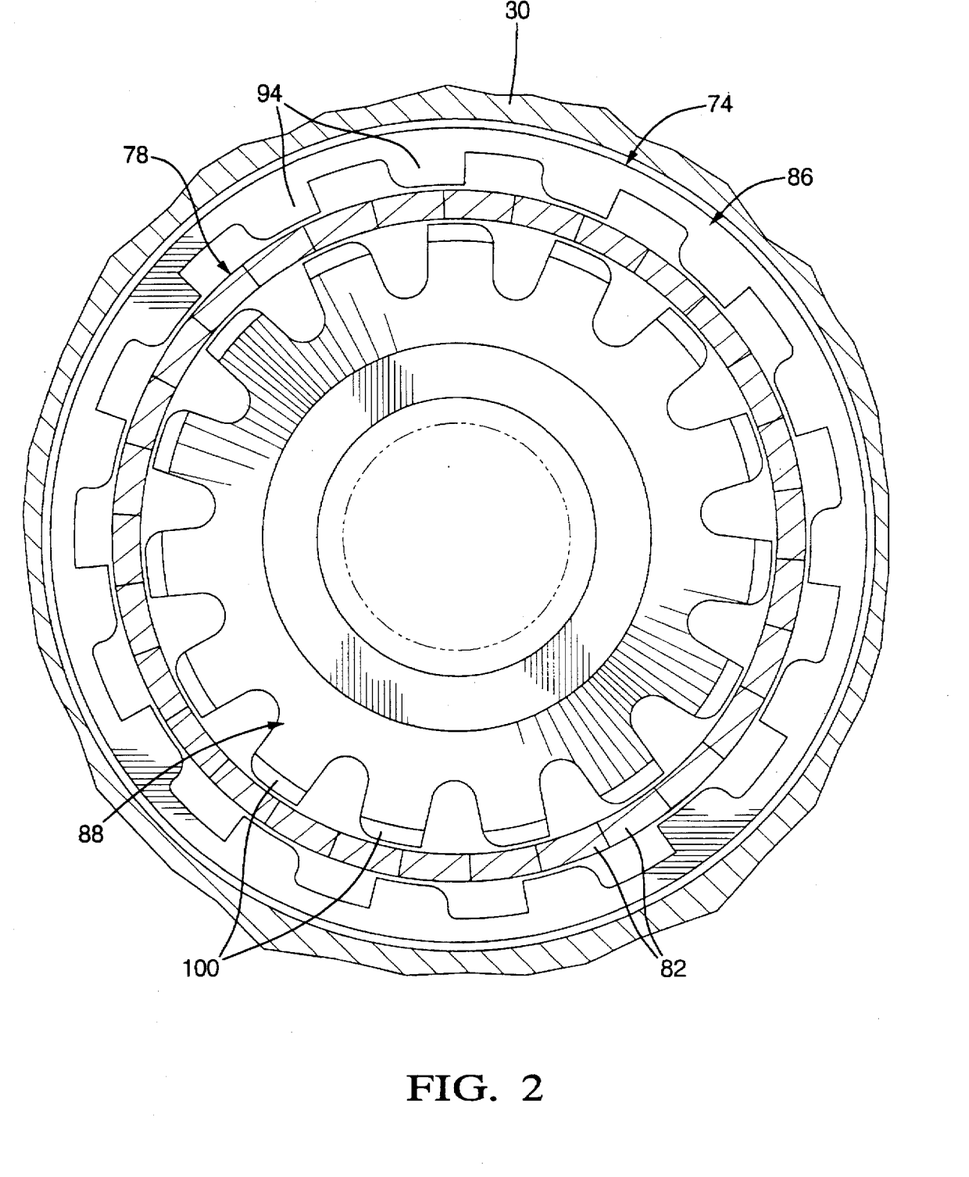
FIG. 2 is a sectional view taken generally along the plane indicated by lines 2—2 in FIG. 1.

As seen in FIG. 1 and 2, permanent magnet assembly 76 includes a cylindrical permanent magnet ring 78 and a retaining hub 80 on spool shaft 34. Ring 78 may be made of sintered powdered metal magnetized to define an even number "n" of radially oriented permanent magnets 82, the polarity of which alternate around the ring. An axial end of permanent magnet ring 78 is rigidly attached to retaining hub 80, whereby the magnet ring is supported on spool shaft 34 symmetrically around centerline 26. Hub 80 and permanent magnet ring 78 are connected to spool shaft 34 for rotation as a unit with the spool shaft and valve spool 64 around centerline 26 by a plastic ring 84 which is injection molded in situ through a bore in the web of the retaining hub.

Referring to FIG. 2, pole piece 74 includes a cylindrical, magnetic flux conducting outer ring 86 radially outside or outboard permanent magnet ring 78 and a cylindrical, magnetic flux conducting inner ring 88 radially inside or inboard the magnet ring. As seen in FIG. 1, inner and outer rings 88 and 86 are rigidly interconnected by an annular, non-ferromagnetic flat plate 90 in a radial plane perpendicular to centerline 26. Inner ring 88 has a tubular skirt 92 inside exciting coil 72 which is press fitted on an extension of the bushing ring 60B whereby pole piece 74 is rotatable as a unit with valve body 58 and pinion head 18 around centerline 26 relative to spool shaft 34 and valve spool 64.

Figure 3:
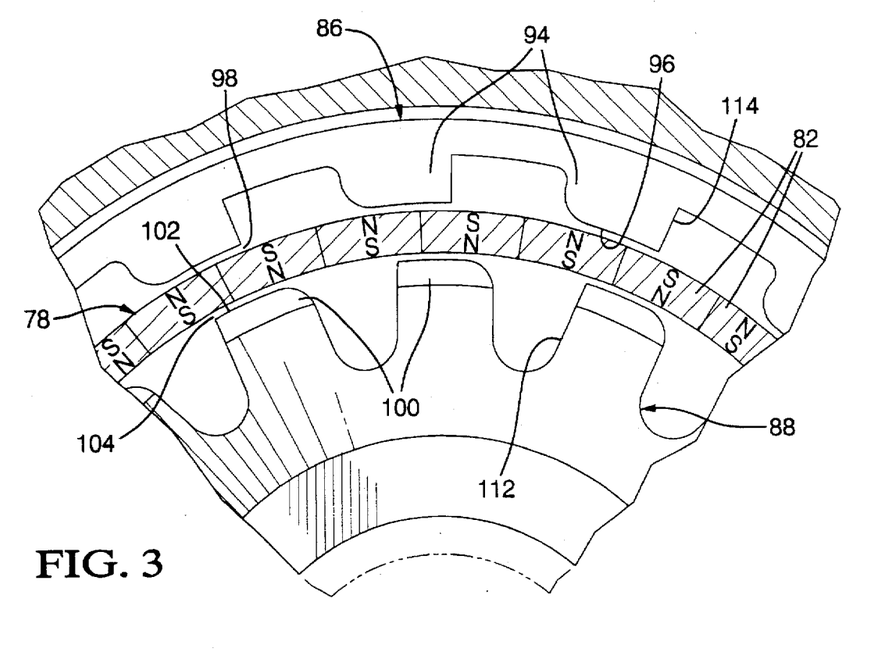
FIG. 3 is an enlarged view of a portion of FIG. 2.

Referring again to FIG. 2, outer ring 86 has n/2 integral outer pole teeth 94 extending radially inward toward magnet ring 78. As seen best in the enlarged view of FIG. 3, each outer pole tooth 94 has an inboard end 96 facing permanent magnet ring 78 and separated therefrom by an outer air gap 98 having a predetermined radial dimension. Similarly, inner ring 88 has n/2 integral inner pole teeth 100 extending radially outward toward magnet ring 78. Each inner pole tooth 100 has an outboard end 102 facing permanent magnet ring 78 and separated therefrom by an inner air gap 104 having a predetermined radial dimension. The radial dimensions of the inner and outer air gaps 104, 98 are exaggerated in FIGS. 3–4 for clarity. As seen in FIG. 2 and 3, there are identical numbers of inboard teeth 94 of outer ring 86 and outboard teeth 100 of inner ring 88. Each of the latter is opposingly matched with one of the former to form a radially arranged pair of pole teeth, one from each of the inner and outer rings. Teeth 100 of inner ring 88 in this embodiment are angularly offset to the right with respect to corresponding teeth 94 of outer ring 86; but each pair of teeth defines a region of circumferential overlap therebetween, corresponding to the angle, in FIG. 3, between a counterclockwise radial edge 112 of a tooth 100 and a clockwise radial edge 114 of a tooth 94. A center of each pole tooth pair is defined midway between the centers of the inner and outer pole teeth of the pair. If the inner and outer teeth were not offset, the region of circumferential overlap would be the entire tooth width with the center of the pair corresponding with the centers of the individual teeth.

Permanent magnets 82 are separated from each other by boundaries 110 and are evenly arrayed around the circumference of permanent magnet ring 78 so that the angular interval between boundaries 110, and thus the effective circumferential extent of each magnet 82, is 360/n degrees. In the embodiment shown, for example, magnet ring 78 includes 30 magnets 82, each subtending an angle of 12 degrees. With no electric current in exciting coil 72, magnetic interaction between permanent magnets 82 and pole teeth 94, 100 due solely to the permanent magnets defines a plurality of neutral or null positions of pole piece 74 relative to permanent magnet assembly 76, as seen in curve 200 of FIG. 5, in which electromagnetic torque between permanent magnet ring 78 and pole piece 74 is plotted as a function of arbitrary rotational position with no current in exciting coil 72. In the null positions, net force reactions between the magnet ring and the pole teeth are in static equilibrium, so that the net torque reaction between permanent magnet assembly 76 and pole piece 74 due to permanent magnets 82 is zero.

Outer pole teeth 94 are magnetically coupled to exciting coil 72 by the wall of large diameter part 30 of valve housing 16. Inner pole teeth 100 are magnetically coupled to the exciting coil by tubular skirt 92 and valve body 58. When electric current flows in the exciting coil, inner pole teeth 100 assume opposite polarity from outer pole teeth 94 depending upon the direction of current flow. Electromagnetic flux concentrated by the inner and outer pole teeth traverses the inner and outer air gaps 104, 98 and interacts with the permanent magnetic flux of permanent magnets 82 to either attract or repel the permanent magnets.

For optimum steering gear performance, a null position of pole piece 74 relative to permanent magnet assembly 76 must coincide with the aforesaid center position of valve spool 64 relative to valve body 58. To achieve such coincidence, proportional control valve 38 is first assembled in composite housing 12 with the center position of valve spool 64 relative to valve body 58 captured by drilling holes for and inserting pin 52 in the torsion bar and the spool shaft after the proportional control valve is hydraulically balanced. Permanent magnet assembly 76 is then rotated on the spool shaft to the aforesaid null position. Finally, ring 84 is in situ injection molded between retaining hub 80 and spool shaft 34 to capture the position of the permanent magnet assembly relative to the pole piece. Since the null position of electromagnetic apparatus 70 is made to correspond with the center position of valve spool 64 in proportional valve 38, the two terms will be used interchangeably in this specification.

Figure 4:
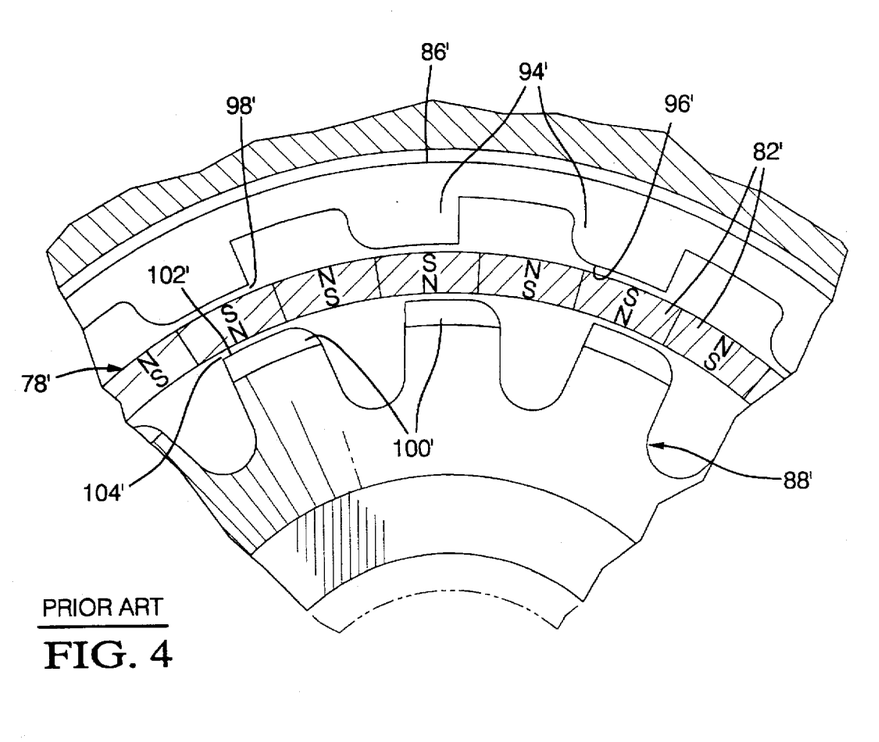
FIG. 4 is an enlarged view of a portion of a motor vehicle power steering gear of the prior art.
Figure 5:
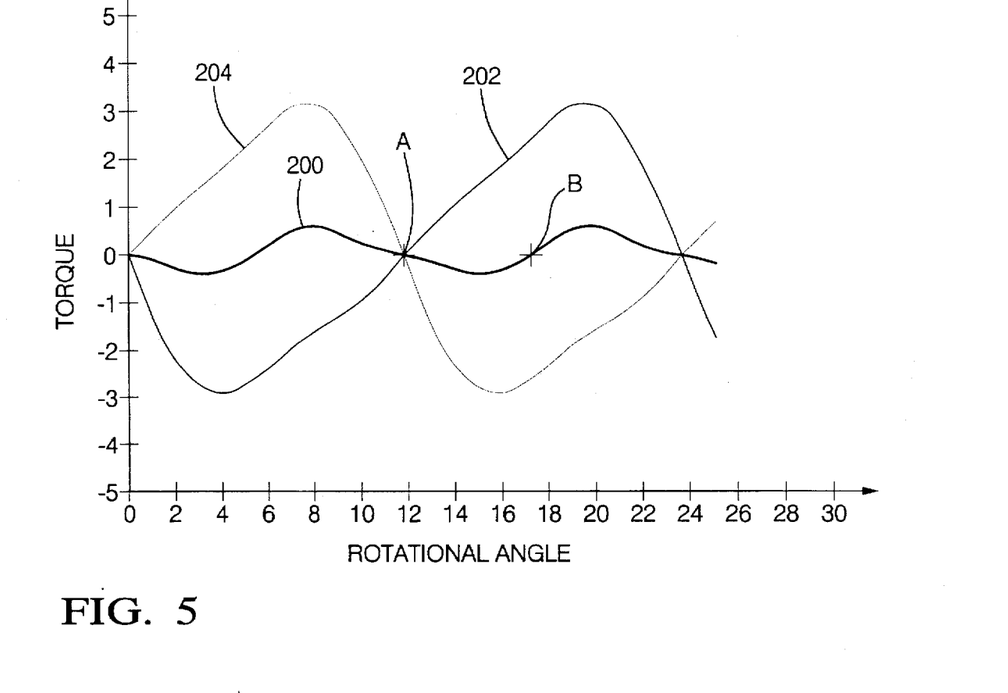
FIG. 5 is a set of curves showing typical magnetic actuator torque as a function of rotational angle for vehicle power steering gear apparatus of the type including some of the prior art devices recited above and also the power steering gear of this invention.
Figure 6:
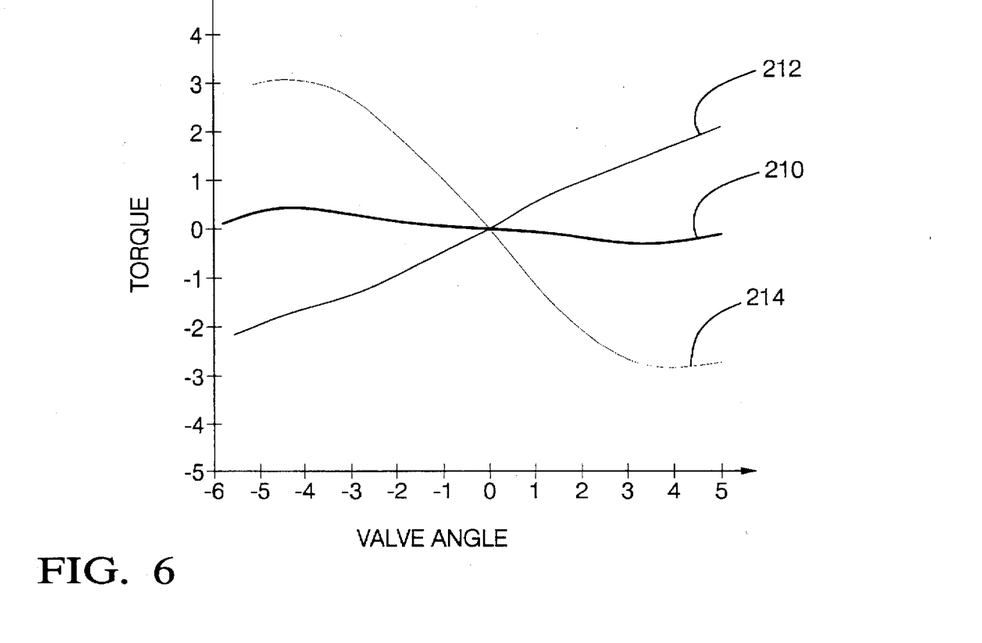
FIG. 6 is a set of curves showing available electromagnetic torque for power steering gear of the prior art.

The advantages of this invention are obtained by a modification of the orientation of permanent magnet ring 78 with respect to pole piece 74 in the center position of valve spool 64 in proportional control valve 38. The null positions of the apparatus may be divided into two groups, the null positions in each group being electromagnetically indistinguishable from the others in the same group. Power steering gears of the prior art, as seen in FIG. 4, use a position corresponding to point A of curve 200 in FIG. 5, a null position in which the centers of alternate ones of permanent magnets 82 are aligned with the centers of the regions of circumferential overlap of the pole tooth pairs in pole piece 74. The torque produced with such an orientation when current is applied to exciting coil 72 is shown by curves 202 and 204 of FIG. 5, which show the variation of torque with valve rotation for oppositely directed three amp currents. The portion of these curves around point A of FIG. 5 are redrawn in FIG. 6 as curves 212 and 214, with zero angle corresponding to point A in FIG. 5 and curve 210 corresponding to no current through the coil. Although the addition of current in exciting coil 72 in the center or null position increases the various opposing torques between permanent magnet member 78 and pole piece 74, these torques remain in balance and the net torque in the center position remains zero, regardless of current level. When permanent magnet ring 78 is rotated from the center position, current in one direction produces opposite magnetic poles in the inner and outer teeth of each pair, which poles thus attract the closest poles of magnets 82'. This produces a restoring electromagnetic torque which effectively adds to the restoring torque of torsion bar 40 and therefore increases the net restoring torque and apparent steering effort, as seen in curve 212 of FIG. 6. Current in the opposite direction produces the opposite magnetic poles in the teeth, which thus repel the closest poles of magnets 82'. This produces a rotation aiding torque, which opposes the restoring torque of torsion bar 40 and therefore decreases the net restoring torque and apparent steering effort, as seen in curve 214 of FIG. 6. However, since torque increases linearly from zero at the center position, the available electromagnetic torque near the center position at point A is small at any reasonable current level. The situation is not much affected by the mechanical torque of torsion bar 40, which also varies linearly from zero at zero angle. The shortage of available electromagnetic torque near the center position works directly against any attempt to establish a steering preload in such apparatus electromagnetically.

In the apparatus of this invention, however, magnet ring 78 is oriented in the center position in a position of zero electromagnetic torque with no current in exciting coil 72 corresponding with point B of curve 200 in FIG. 5. Point B corresponds to a six degree offset from point A, which offset is essentially one half magnet pitch or one quarter tooth pitch. In this orientation, as seen in FIG. 3, alternate ones of boundaries 110 which separate the magnets aligned substantially with the centers of the regions of circumferential overlap of successive tooth pairs. Thus, a first-boundary 110 is aligned with the center of one tooth pair; a second successive boundary 110 is aligned between that tooth pair and the next; a third successive boundary 110 is aligned with the center of the next successive tooth pair, in a continuing pattern around permanent magnet ring 78.

Figure 7:
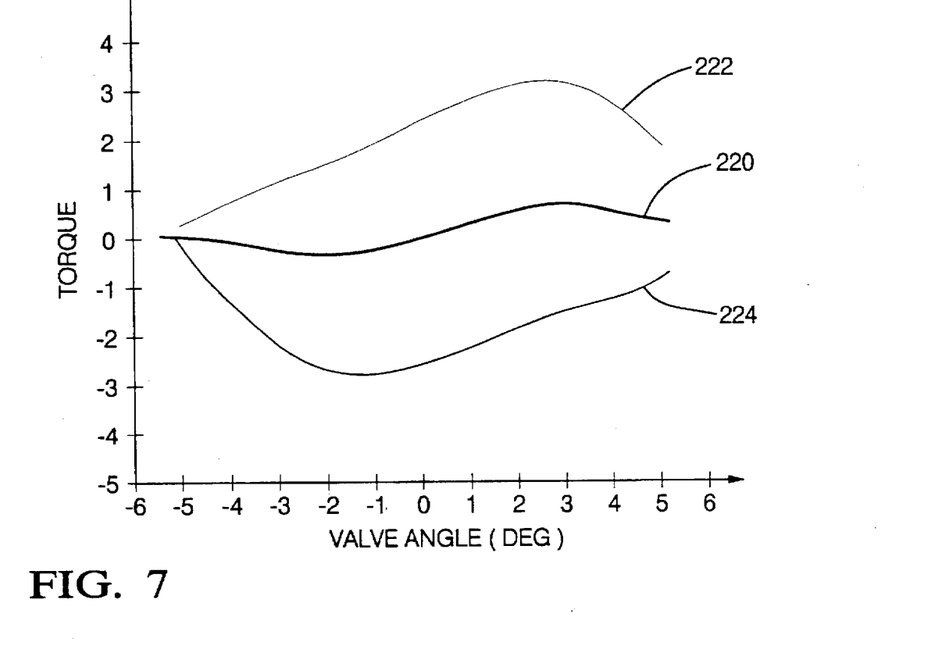
FIG. 7 is a set of curves showing available electromagnetic torque for the power steering gear of this invention.

In this orientation of permanent magnet ring 78 with respect to pole piece 74, when current is increased from zero with the apparatus in the center position, magnetic poles are created in the teeth which act on both poles of magnets 82 to rotate magnet ring clockwise with current in one direction and counter-clockwise with current in the opposite direction. As seen in curves 202 and 204 of FIG. 5, there is substantial electromagnetic torque available at very small angular displacements from the center position at point B as well as larger angular displacements. The portion of these curves around point B of FIG. 5 are redrawn in FIG. 7 as curves 222 and 224, with zero angle corresponding to point B in FIG. 5. Substantial electromagnetic torque is available at small displacements from the center position, as shown in FIG. 7, wherein curve 220 represents electromagnetic torque with no current, curve 222 represents electromagnetic torque with a current of positive 3 amps and curve 224 represents a current of negative 3 amps.

Although substantial electromagnetic, and thus net, torque is available to provide a steering preload in the apparatus of FIG. 1–3, the preload does not occur merely from the structure but must be achieved by programming electric current through exciting coil 72 as a function of valve angle, which is the angular displacement of the apparatus from the center position. The range over which the current is programmed extends about 4.5 degrees on either side of the center position. For this to be accomplished, a valve angle sensing apparatus is required. In this embodiment, valve angle sensing apparatus is provided in the form of a pair of angle sensors seen in FIG. 1: angle sensor 250 providing a signal indicating a rotational angular position of pinion head 18, which rotates as one with valve body 58 and pole piece 74, and angle sensor 260 providing a signal indicating a rotational angular position of spool shaft 34 and magnet ring 78. When sensors 250 and 260 are calibrated for zero difference in the center position, the difference (magnitude and sign) in the signals from these sensors provides a valve angle signal. Alternatively, a valve angle sensor could be built into steering gear 10 to provide a single output valve angle signal.

Figure 9:
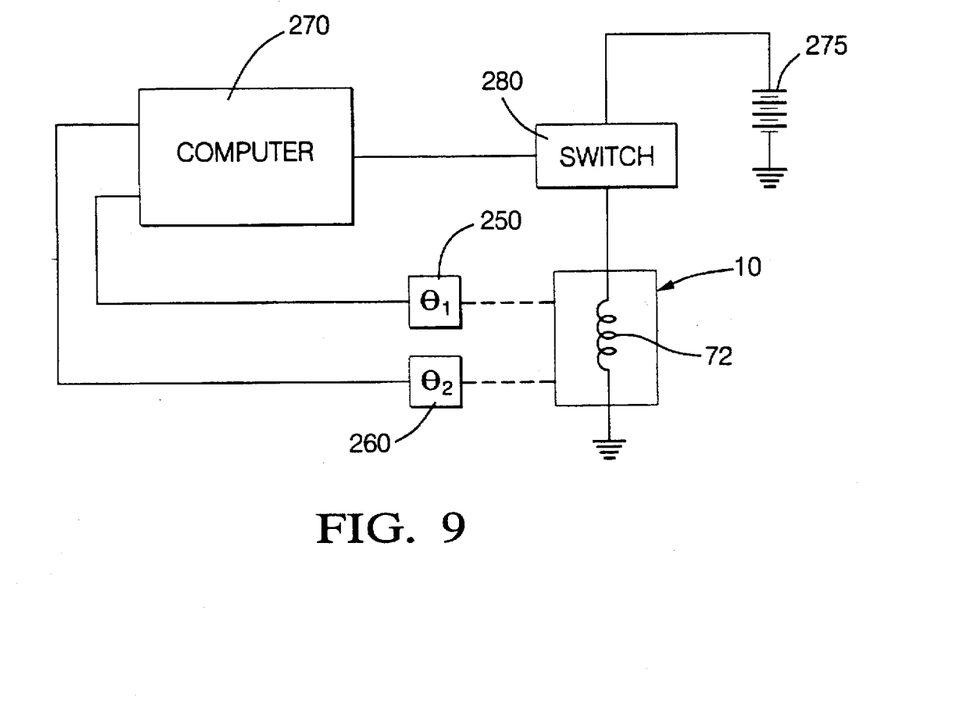
FIG. 9 is a block diagram of a valve angle responsive current control for the power steering gear of FIG. 1–3.

FIG. 9 shows a control for the current through exciting coil 72 as a function of valve angle. A digital computer 270 is programmed to receive the valve angle signals $\theta_1$ and $\theta_2$ from sensors 250 and 260 and output a PWM signal derived therefrom to a switch 280 which controls current from an electric power source 275 through exciting coil 72 of power steering gear 10. Computer 270 may be a standard digital computer based on a microprocessor with I/O apparatus, ROM, RAM and other typical computer components. Switch 280 is preferably a semiconductor switch such as a FET capable of PWM switching operation. Electric power source 275 may be a standard vehicle DC electrical system.

Figure 10:
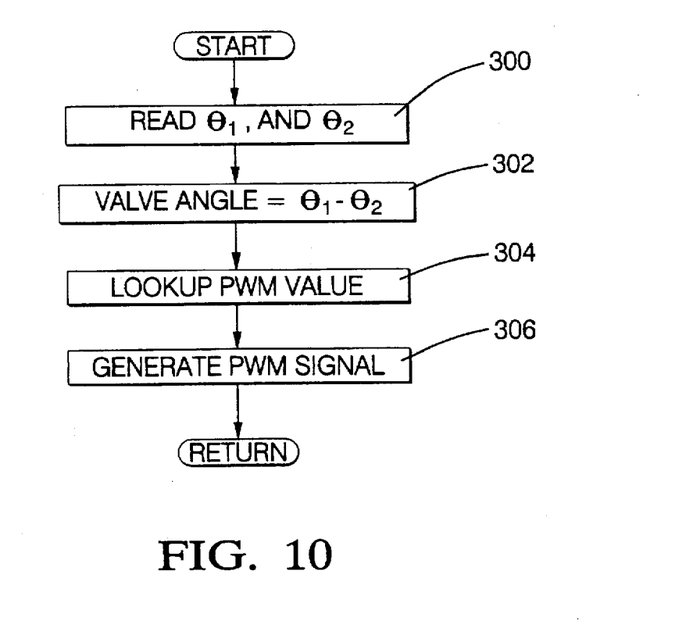
FIG. 10 is a flow chart illustrating the operation of the control of FIG. 9.

FIG. 10 provides a flow chart illustrating the operation of a program followed by computer 270 in controlling the current through exciting coil 72 in response to the valve angle of steering gear 10. The program starts by reading the valve angle signals $\theta_1$ and $\theta_2$ from sensors 250 and 260 in step 300. The program then computes the valve angle from the difference between signals $\theta_1$ and $\theta_2$ in step 302. This step would be unnecessary if a single valve angle signal is available from a sensor. The program then uses the computed valve angle to enter a lookup table in step 304 and read a corresponding electric current value which is part of a stored angle/current function. The electric current value is preferably in the form of a number representing a duty cycle calculated to produce an average desired current through exciting coil 72. Finally, the program generates a PWM signal from the electric current value in step 306. The PWM signal is output in a normal manner to control the operation of switch 280 in PWM operation to achieve the desired current level in exciting coil 72. If desired, the program may also read a vehicle speed signal available from the vehicle engine control or a separate sensor and use this signal as an additional input parameter in the table lookup of step 304.

Figure 8:
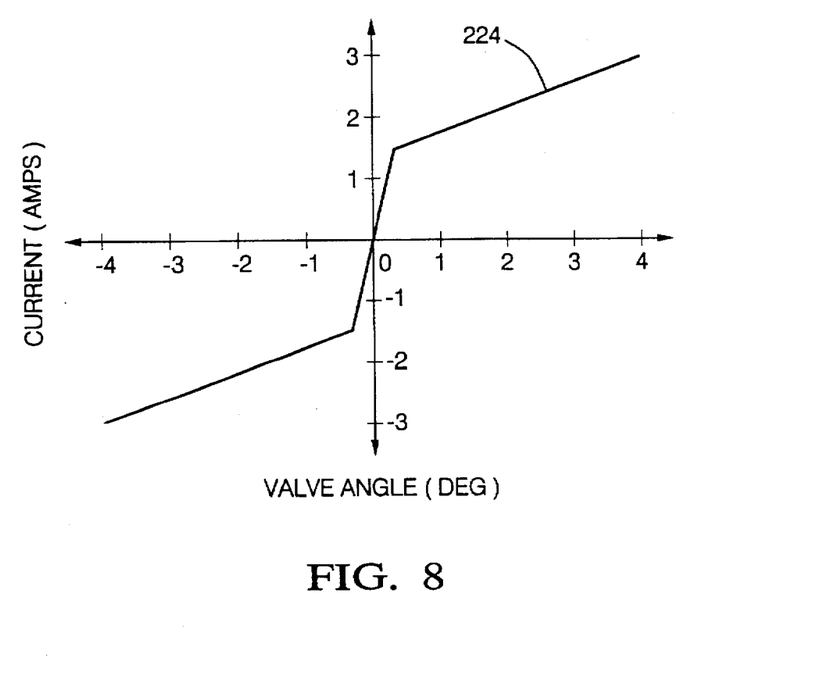
FIG. 8 is a set of curves showing typical programmed current as a function of valve angle for the power steering gear of this invention in order to achieve a variety of steering characteristics, including preload.

A typical preload angle/current function is shown in curve 285 of FIG. 8. This curve has a very steep slope for a small range of valve angle around the center position so as to provide a quick increase in restoring torque just off center for a "crisp" steering "feel." At a predetermined valve angle (about ⅓ degree), in each rotational direction, the slope decreases significantly to prevent steering effort from rising too much at greater valve angles, such as those encountered in highway exit ramps. Of course, the preload angle/current function shown may be modified to provide other angle/current programs, if desired.

I claim:

1. In a motor vehicle power steering gear having a proportional control valve comprising a valve spool connected to a steered wheel of the vehicle, a valve body connected to a manual steering wheel of the vehicle and rotatable with respect to the valve spool, and a torsion bar having a first end rotationally coupled to a steerable wheel of the vehicle and a second end connected to the manual steering wheel of the vehicle, the valve spool having a center position relative to the valve body with the torsion bar resisting relative rotation of the valve spool from the center position with a restoring torque proportional to the amount of twist of the torsion bar caused by manual effort applied at the manual steering wheel of the vehicle, and an electromagnetic apparatus for varying the magnitude of the restoring torque of the torsion bar comprising a stationary exciting coil, a permanent magnet assembly including a cylindrical permanent magnet ring connected to the valve spool for rotation as a unit therewith and having a first plurality of permanent magnets thereon of alternating radial polarity, each permanent magnet being separated circumferentially from adjacent permanent magnets by boundaries, and a pole piece connected to the valve body for rotation as a unit therewith and magnetically coupled to the exciting coil, the pole piece having a magnetic flux conducting outer ring disposed radially outboard of the permanent magnet ring and defining a second plurality, half the first plurality, of outer pole teeth extending radially inward toward the permanent magnet ring and a magnetic flux conducting inner ring disposed radially inboard of the permanent magnet ring and defining a third plurality, equal to the second plurality, of inner pole teeth extending radially outward toward the permanent magnet ring, each of the inner pole teeth defining with one of the outer pole teeth a pole tooth pair with a region of circumferential overlap, the improvement comprising:

the permanent magnet ring being oriented, with the valve spool in its center position, in a position of zero electromagnetic and mechanical torque with no current in the exciting coil and with alternate ones of the boundaries separating the permanent magnets aligned substantially at the centers of the regions of circumferential overlap of successive pole tooth pairs, whereby current in the exciting coil provides torque between the permanent magnet ring and pole piece in and to both sides of the center position of the valve spool.

2. The motor vehicle power steering gear of claim 1, wherein the improvement further comprises:

sensor means for indicating an angle of rotation of the valve spool from its center position;

a source of electric current; and a control responsive to the sensor means for providing electric current from the source of electric current through the exciting coil as a predetermined function of the angle of rotation of the valve spool from the center position.

3. The motor vehicle power steering gear of claim 2, wherein the electric current provided through the exciting coil creates an electromagnetic torque tending to restore the valve spool to the center position, the predetermined function providing electric current increasing rapidly with increasing angle of the valve spool over a range of small angles and less rapidly at greater angles from the center position, whereby a steering preload is created.

* * * * *